United States Patent [19]

Dickinson

[11] Patent Number: 5,048,980
[45] Date of Patent: Sep. 17, 1991

[54] BEARING ASSEMBLY WITH THRUST RESISTANT HOUSING

[75] Inventor: Thorn W. Dickinson, Berlin, Conn.

[73] Assignee: The Torrington Company, Torrington, Conn.

[21] Appl. No.: 617,283

[22] Filed: Nov. 19, 1990

Related U.S. Application Data

[63] Continuation of Ser. No. 449,332, Dec. 11, 1989, abandoned, which is a continuation of Ser. No. 244,230, Sep. 14, 1988, abandoned.

[51] Int. Cl.⁵ ............................................. F16C 27/06
[52] U.S. Cl. ................................................... 384/536
[58] Field of Search ............... 384/535, 536, 581, 582, 384/585, 220, 537

[56] References Cited

U.S. PATENT DOCUMENTS

| 3,301,612 | 1/1967 | Thomas | 384/536 |
| 4,128,281 | 12/1978 | Batkiewicz | 384/536 |
| 4,601,591 | 7/1986 | Wright | 384/536 |
| 4,772,139 | 9/1988 | Bretton | 384/535 |

*Primary Examiner*—Lenard A. Footland
*Attorney, Agent, or Firm*—John C. Bigler

[57] ABSTRACT

The bearing housing has a ring which is molded within the housing and is in front of a leading face of the outer race. The ring molded in the housing restricts diametrical expansion of that portion of the housing which is forward of the leading face of the outer race.

9 Claims, 3 Drawing Sheets

BEARING ASSEMBLY WITH THRUST RESISTANT HOUSING

This application is a continuation of application Ser. No. 449,332, filed Dec. 11, 1989, which is a continuation of Ser. No. 244,230, filed Sept. 14, 1988 now abandoned.

BACKGROUND OF THE INVENTION

1. Field of the Invention

This invention relates to housing for hearing assemblies, more particularly to a reinforced housing for use with a radial bearing.

2. Description of the Prior Art

One bearing housing arrangement which includes elements that resist axial displacement of a bearing is disclosed by E. Scott Wright in U.S. Pat. No. 4,601,591 patented July 22, 1986. It is a bearing damper assembly which has a series of alternating elastomeric and metal radially oriented and axially stacked parallel washers sandwiched between the outer race ring of the bearing and a parallel thrust stop flange. The washer arrangement is designed to provide linear lateral (perpendicular to the bearing axis) damping for the bearing shaft, by having the washers take the deflection in shear stress. The washers, however, also cushion against axial thrust loads by their compression. The thrust stop flange, and parallel non-elastomeric washers effectively prevent the outer race ring from bypassing the damper assembly.

SUMMARY OF THE INVENTION

According to the invention, there is provided a housing for use with a radial bearing assembly. The housing comprises a flexible support member and a restricting means within the flexible support member. The flexible support member is formed of an elastomeric material and encases surfaces of the outer race ring of the radial bearing assembly. A first portion of the flexible support member extends radially inward in front of a leading end surface of the outer race ring. The restricting means limits diametrical expansion of said first portion to prevent leveraging of the first portion radially outward from the central axis of the bearing assembly and forward, and to prevent escape of the outer race ring from the flexible support member by excessive forward movement of the outer race ring in a predetermined axial direction.

An annular leverage stop ring that is resistant to expansion of its diameter, may be molded within the housing with at least a portion forward of the leading face, for restricting diametrical expansion of a portion of the housing that is forward of the leading face of the outer race ring. In one preferred embodiment, the leverage stop ring occupies a diameter within the housing, that is smaller than the outside diameter of the leading annular face. In another embodiment it may occupy a diameter that is larger than the inside diameter of the leading annular face.

The housing is adapted for receiving means for positioning the leverage stop ring in the housing. For example, openings may be included in the housing for supports to position the leverage stop ring during molding of the housing. In another embodiment of the invention, the leverage stop ring includes means for positioning it within a mold for the housing, for molding it within the housing.

The leverage stop ring generally is a circumferential metal band having a radially oriented annular surface. It can, however, take other forms and be made from other materials that are resistant to expansion of the diameter of the ring. For example, the leverage stop ring may take the form of two annular bands joined along their length and angled from one another, or it can be made from flexible fibers.

DESCRIPTION OF THE PREFERRED EMBODIMENTS

Figure 1:
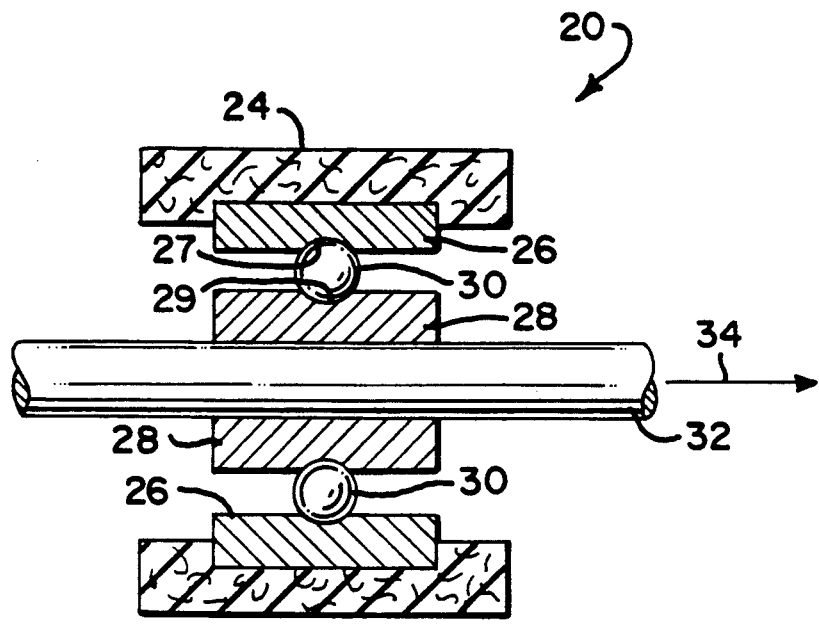
FIG. 1 is a partial perspective, cross sectional side view of a prior art bearing assembly that is not under operating load.

FIG. 1 shows a bearing assembly 20 of the type that is presently used in heavy duty trucks for intermediate support of the drive shaft. Located within elastomeric housing 24 and retained by housing 24, is outer race ring 26.

Between outer race ring 26 and inner race ring 28, is located an annular series of rolling elements 30, positioned in recessed races 27 and 29 of outer and inner race rings 26 and 28 respectively.

Inner race ring 28 surrounds and grips shaft 32 in a press fit. Drive shaft 32 encounters a unidirectional axial thrust force, and shifts axially in the direction represented by arrow 34, when the shaft is driving into a heavy load such as when the truck accelerates from a standstill. When not loaded, or lightly loaded as in cruise, the shaft shifts back to an at-rest position.

Figure 2:
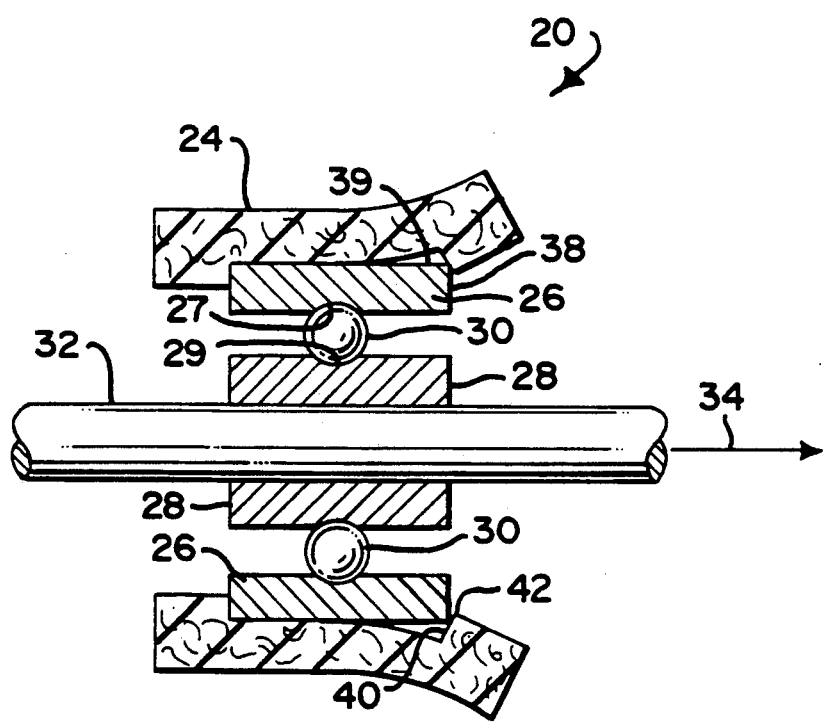
FIG. 2 is a partial perspective, cross sectional side view of the bearing shown in FIG. 1, that is under operating load.

FIG. 2 shows shaft 32 under load. Axial thrust is translated to inner race ring 28 by the shaft, and to outer race ring 26 by way of inner race 29, rolling elements 30, and outer race 27. The thrust is expressed in direction 34 at leading annular face 38 with respect to direction 34, of race ring 26, against mating surface 40 of housing 24.

Inner trailing edge 42 of housing 24 is leveraged radially outward from the central axis of the bearing, and forward, whereby leading annular face 38 of race ring 26 moves forward to an excessive degree, or escapes retention by mating surface 40 of the housing altogether if edge 42 slips outward past major diameter 39 of leading annular face 38 of outer race ring 26.

The invention will now be described in detail with respect to preferred embodiments, however it is to be understood that the invention is capable of other embodiments and of being practiced or carried out in various ways.

Figure 3:
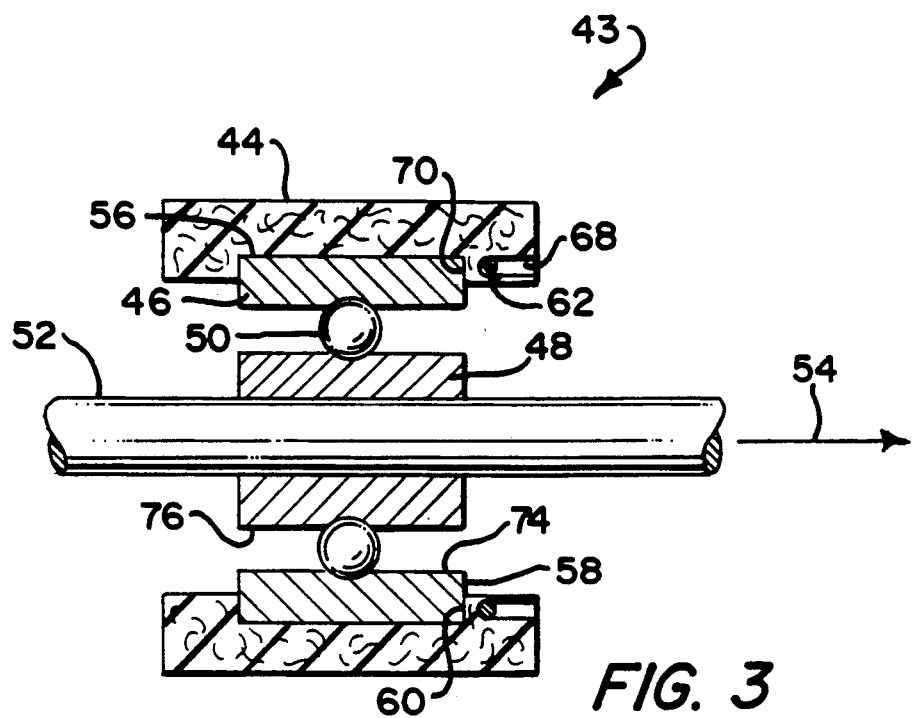
FIG. 3 is a partial perspective, cross sectional side view of a bearing assembly with reinforced housing according to the present invention.
Figure 4:
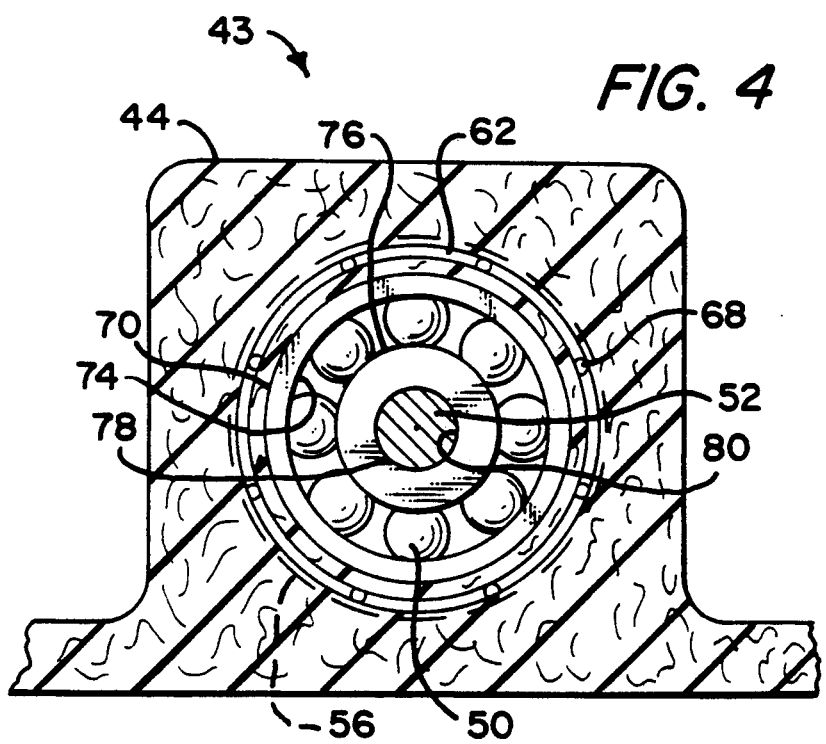
FIG. 4 is a partial perspective, cross sectional end view of the bearing assembly shown in FIG. 3.

FIGS. 3 and 4 show a bearing assembly 43, constructed according to a preferred embodiment of the invention. The bearing is mounted on drive shaft 52 and located within and retained in elastomeric bearing housing 44, similarly to earlier described bearing assembly 20. In assembly 43, the unidirectional thrust force in direction 54, from shaft 52 is transmitted by way of inner race ring 48 and rolling members 50 to outer race ring 46. Leading annular face 58 of bearing race ring 46 delivers the thrust force to mating surface 60 of the housing in the direction represented by arrow 54.

Forward of mating surface 60, molded within the housing, is leverage stop ring 62. The ring has an outside diameter with respect to the bearing axis, that preferably is smaller than the outside diameter 56 of the leading annular face 58 of outer race ring 46.

During molding of the housing, the ring 62 is held in place by mold support pins. Openings 68, left in the housing by the mold pins when they were withdrawn, may be seen in FIGS. 3 and 4.

Leverage stop ring 62 holds the inner trailing edge 70 of the housing to a diameter with respect to the bearing axis, that is smaller than the outside diameter 56 of the leading annular face 58 of outer race ring 46. Limiting the diameter has the effect of preventing inner trailing edge 70 from leveraging radially outward from the central axis of the bearing, and forward, thereby preventing escape of outer race ring 46 from housing 44 by excessive forward movement of the race ring.

Referring to FIG. 4, it may be seen that the inside diameter 80 of inner race ring 48 is in press fit with outer diameter 78 of drive shaft 52. Also shown are the relative orders of; outside diameter 76 of inner race ring 48, rolling members 50, inner trailing edge 70 of housing 44 in this instance being coincidental with the inner edge 70 of the housing, inside diameter 74 of the leading annular face of outer ring 46, leverage stop ring 62, and mold support pin openings 68, and the outside diameter 56 of the leading annular face of outer ring 46.

It is preferable that leverage stop ring 62 have an outside diameter smaller than the outside diameter 56 of the leading annular face 58 of outer race ring 46, and an inside diameter larger than the inside diameter 74 of face 58. It may, however, have a greater or lesser diameter as long as it is molded in the housing and occupies an annular location forward in the direction 54, of the leading edge of the outer bearing ring. The resistance of the stop ring 62 to change in diameter is thereby imparted to mating surface 70 of the housing in order to stop unwanted leveraging of the leading edge of the housing as explained earlier.

Figure 5:
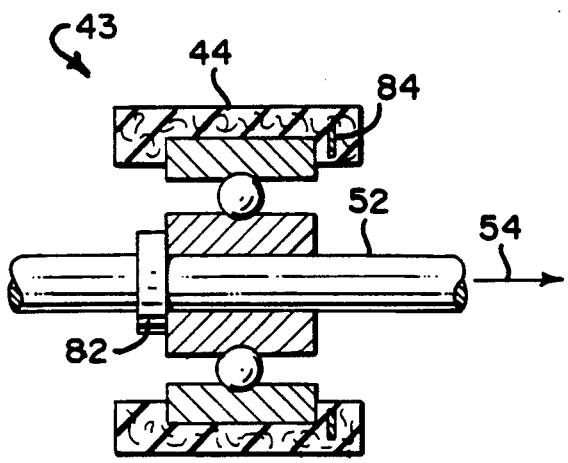
FIG. 5 is a partial perspective, cross sectional side view of another embodiment of the invention.

The molded-in leverage stop ring of the present invention provides several magnitudes of resistance to leveraging over that of the prior art. Concomitantly, it permits greater latitude in the choice of stiffness or resiliency for the housing, so that the housing can be better tuned to absorb unwanted vibration. It permits use of lighter weight housings, and is better suited to shaft mounting arrangements which can transmit higher axial thrust, such as by shoulder 82 on shaft 52, as shown in FIG. 5.

Figure 6:
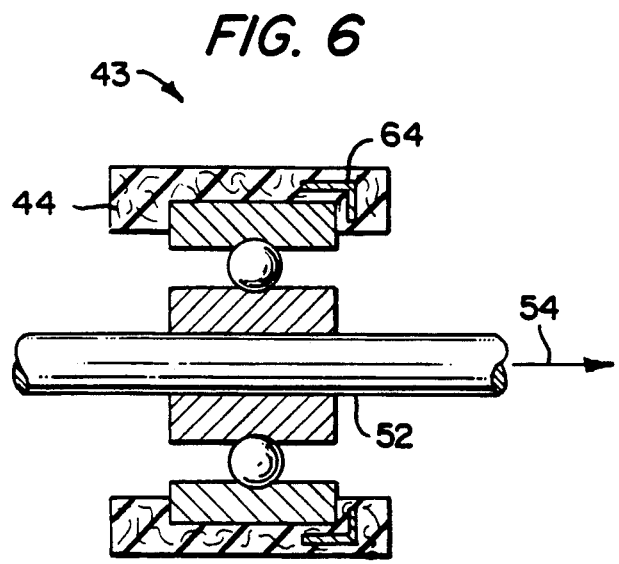
FIG. 6 is a partial perspective, cross sectional side view of another embodiment of the invention.

The leverage stop ring can take one of several forms. A form is selected that is most suited to molding in a housing, and to resist leveraging. For example, it can take the form of band 84, shown in FIGS. 5, and 9. It can take the form, seen in cross section in FIG. 6, of annular right angle bracket 64, providing resistance in perpendicular planes to leveraging. The annular band 65 is forward of the outer race ring leading face and extends radially. The annular band 67 extends longitudinally and overlaps the outside periphery of the outer race ring. It can take the form of round wire 66, as shown in FIG. 7.

Figure 9:
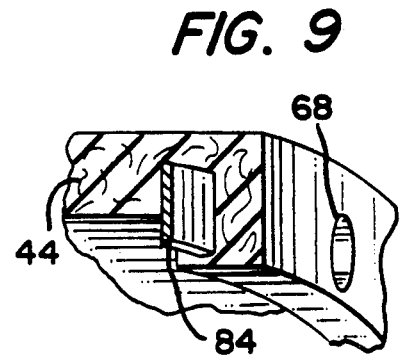
FIG. 9 is a partial perspective, cross sectional view of a housing with leverage stop ring according to another embodiment of the invention.
Figure 7:
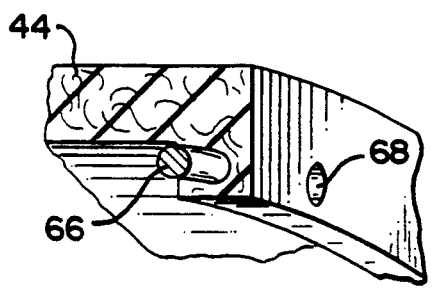
FIG. 7 is a partial perspective, cross sectional view of a portion of the housing showing a leverage stop ring, with the housing adapted for receiving means for positioning the leverage stop ring in the housing during molding.

Mold support pin opening 68 shown in FIGS. 7 and 9, results from accessing the leverage stop ring during the molding process in order to hold it in place while the housing material, usually an elastomer, is introduced into the mold and while it cures.

Figure 8:
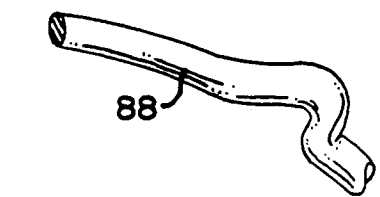
FIG. 8 is a perspective view of a section of a leverage stop ring which includes means for positioning it within the housing during molding.
Figure 10:
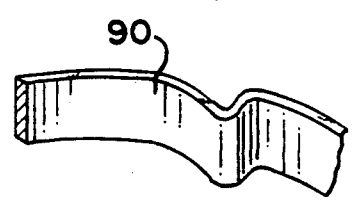
FIG. 10 is a perspective view of a section of a leverage stop ring which includes means for positioning it within the housing, according to another embodiment of the invention.
Figure 11:
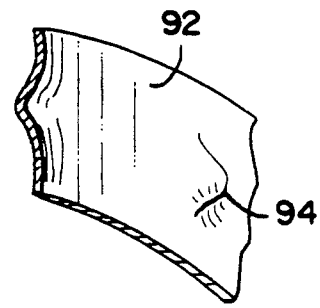
FIG. 11 is a perspective view of a section of a leverage stop ring which includes means for positioning it within the housing, according to another embodiment of the invention.

It is important to hold the leverage stop ring securely against the usually high pressure material flow that occurs when the mold is filled. In lieu of a mold pin, the leverage stop ring is provided with projections which space it from the mold wall so that it is self supporting within the mold. Self supporting wire 88 and self supporting band 90 shown in FIGS. 8 and 10 respectively, have bends or kinks to provide the projections. Self supporting band 92 shown in FIG. 11 has a series of opposed dimples 94 along its length for holding it in place within the mold during the molding operation.

Since the leverage stop ring operates as a means to restrict diametrical expansion of the portion of the housing that is forward of the leading edge of the outer bearing ring, rather than operating as a stop face against axial thrust as with an external thrust washer, it need not be made from metal. The ring can be made from a material which can bend and flex, so long as it does not materially expand. A ring made from fiberglass, for example, will perform well.

I claim:

1. A housing for use with a radial bearing assembly, said radial bearing assembly having an annular outer race ring with a central axis, an outer surface, a first end surface, and a second end surface, said first end surface being a leading annular face oriented in a predetermined axial direction, and a coaxial annular inner race ring radially inward of the outer race ring mountable on a shaft, said inner race ring being rotatable relative to the outer race ring, said housing comprising:

a flexible support member formed of an elastomeric material encasing said outer surface and at least part of said first and second end surfaces of the outer race ring, said flexible support member having a first portion extending radially inward in front of said first end surface and a second portion extending radially inward in back of the second end surface; and restricting means within the flexible support member for limiting diametrical expansion of said first portion of the flexible support member to prevent leveraging of the first portion radially outward from the central axis and forward, and to prevent escape of the outer race ring from the flexible support member by excessive forward movement of the outer race ring in the predetermined axial direction.

2. The housing as defined in claim 1, wherein the restricting means includes a circumferential band resistant to diametral expansion molded into the flexible support member, at least a part of said circumferential band being forward of the outer race ring leading face, for imparting resistance to changes in diameter to said first portion of the flexible support member to stop leveraging of the first portion radially outward from said central axis and forward.

3. The bearing assembly described in claim 2, wherein said circumferential band has an outside diameter smaller than the inside diameter of said leading annular face.

4. The bearing assembly described in claim 2, wherein said circumferential band comprises two annular bands at right angles to one another, one annular band being forward of the outer race ring leading face and extending radially, the other annular band extending longitudinally and overlapping the outside periphery of the outer race ring.

5. The bearing assembly described in claim 2, wherein said circumferential band comprises a metal band, having a radially oriented annular surface.

6. The bearing assembly described in claim 2, wherein said circumferential band comprises flexible fibers.

7. The bearing assembly described in claim 2, wherein said circumferential band has an outside diameter smaller than the outside diameter of said leading annular face.

8. The housing described in claim 2, wherein said circumferential band is a round wire having a circular cross section.

9. The housing described in claim 2, wherein said resilient housing has multiple holes spaced around said first portion, said holes being parallel to said shaft and extending from said circumferential band to the outer surface of said first portion so as to provide access holes for mold support pins during the molding process.

* * * * *